M. J. TRUMBLE.
TRACTOR.
APPLICATION FILED FEB. 4, 1920.
1,371,453.
Patented Mar. 15, 1921.
3 SHEETS—SHEET 1.
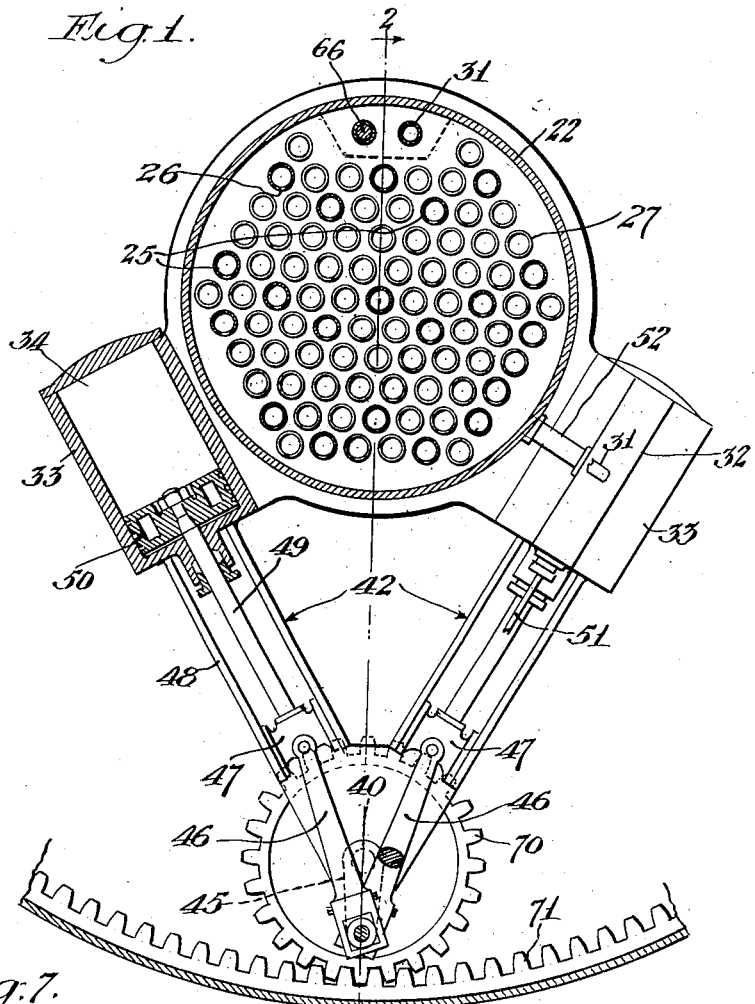
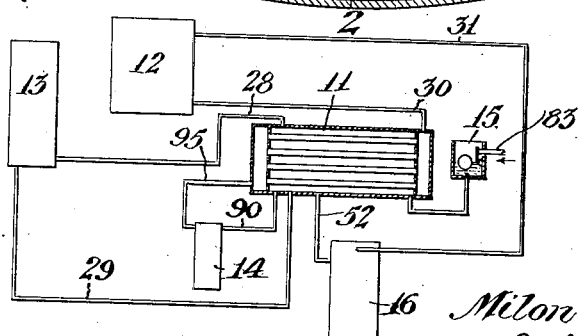
Inventor
Milon J. Trumble
by Graham + Harris
Attorneys.

M. J. TRUMBLE.
TRACTOR.
APPLICATION FILED FEB. 4, 1920.
1,371,453.
Patented Mar. 15, 1921.
3 SHEETS—SHEET 2.
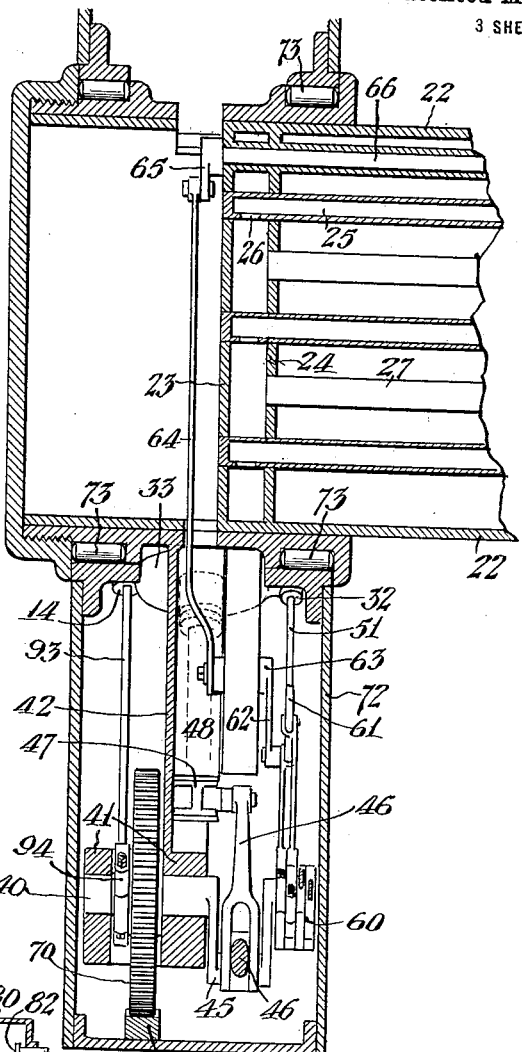
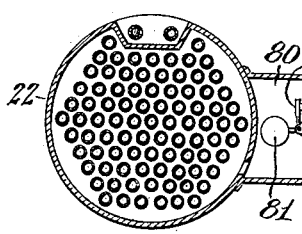
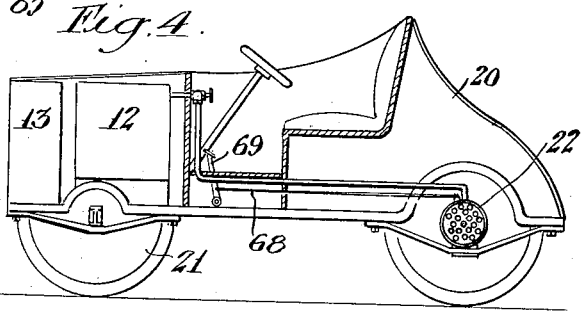
Inventor
Milon J. Trumble
by Graham + Harris
Attorneys M. J. TRUMBLE.
TRACTOR.
APPLICATION FILED FEB. 4, 1920.
1,371,453.
Patented Mar. 15, 1921.
3 SHEETS—SHEET 3.
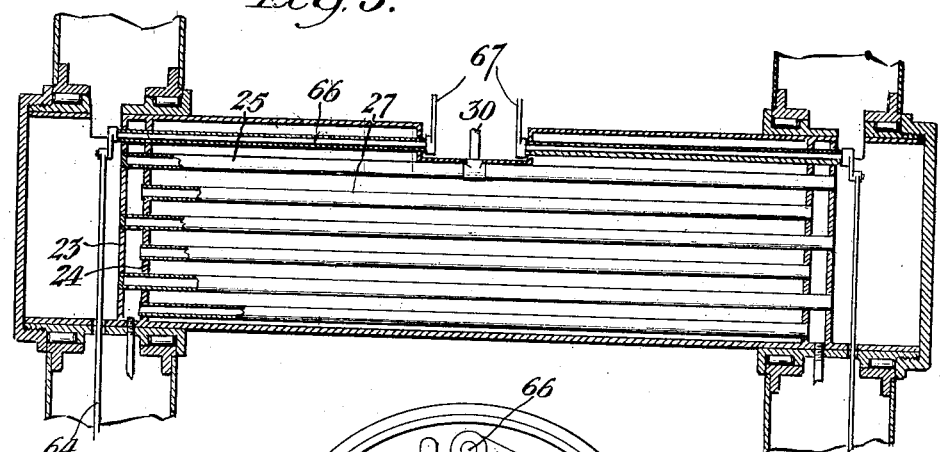
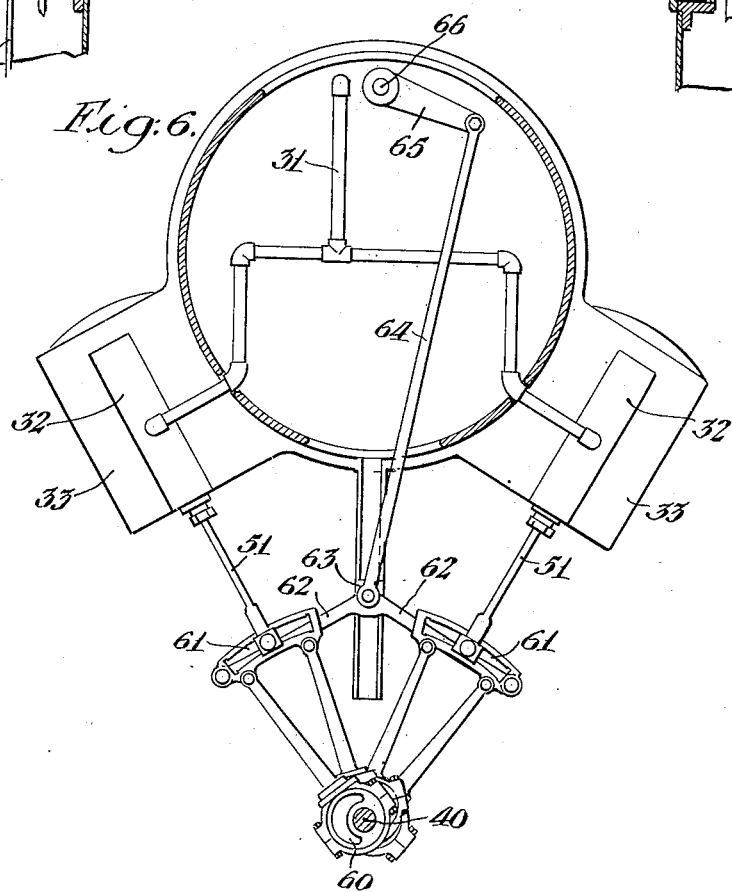
Inventor
Milton J. Trumble
by Graham + Harris
Attorneys

UNITED STATES PATENT OFFICE.

MILON J. TRUMBLE, OF ALHAMBRA, CALIFORNIA.

TRACTOR.

1,371,453.

Specification of Letters Patent.

Patented Mar. 15, 1921.

Application filed February 4, 1920. Serial No. 356,285.

*To all whom it may concern:*

Be it known that I, MILON J. TRUMBLE, a citizen of the United States, residing at Alhambra, in the county of Los Angeles and State of California, have invented a new and useful Improvement Comprising Tractors, of which the following is a specification.

My invention relates to tractors and more particularly to steam driven tractors. The principal object of the invention is to provide a tractor or other vehicle having two rear wheels, each of which is driven independently of the other by a steam engine and to provide a novel form of association for all the parts.

Further objects and advantages will be made evident hereinafter.

Referring to the drawings which are somewhat diagrammatic and for illustrative purposes only, Figure 1 is an elevation part in section through one of the driving wheels.

Fig. 2 is a partial section upon a plane represented by a line 2—2 of Fig. 1.

Fig. 3 is a sectional diagram showing the operation of the water reservoir.

Fig. 4 is a view of an automobile embodying my invention.

Fig. 5 is a vertical section through the pre-heater on a somewhat reduced scale.

Fig. 6 is a somewhat diagrammatic view of the valve gear.

Fig. 7 is a diagram showing the piping.

The apparatus employed consists of a pre-heater 11, a boiler 12, a primary condenser or radiator 13, a pump 14, a water supply control tank 15, and the engines 16, hereinafter to be described.

The body of the automobile 20 or tractor is mounted on front wheels 21 and on an axle 22 which forms the shell for the pre-heater 11. This axle 22 is fixed to the frame of the vehicle so that it cannot turn; each end of the axle 22 being closed by a tight head 23, intermediate heads 24 being provided inside the fixed heads. Tubes 25 are secured to the heads 23 having openings 26 communicating with the space between the heads 23 and 24 and tubes 27 are fixed in the heads 24 communicating with the same space.

A steam outlet pipe 28 shown diagrammatically in Fig. 7 connects into the top of the shell 22 between the heads 24 conducting exhaust steam to the primary condenser 13, where it is condensed to form water, this being delivered through a pipe 29 to the same space inside the shell 22. A pipe 30 connects into one of the tubes 25 thus connecting with both of the spaces between the heads 23 and 24, this pipe being shown diagrammatically in Fig. 7, and being used to conduct the water to the boiler 12. The steam from this boiler is delivered through a pipe 31 to valve chests 32 which form a part of cylinder castings 33. The cylinder castings 33 have steam cylinders 34 formed therein, these castings being rigidly secured to the axle 22, and being inclined at an angle to each other, their axes coinciding at the center of a shaft 40 turning in bearings 41 carried on brackets 42, which form part of the cylinder castings 33. The shaft 40 is provided with a crank 45 which is engaged by connecting rods 46; each of the connecting rods 46 is pivoted in a cross head 47, sliding ways 48 being formed on the brackets 42.

The cross heads 47 are driven by piston rods 49 and pistons 50. Each of the cylinders 34 has its steam inlet and outlet controlled through a standard slide valve, not shown but operated through a valve rod 51. The exhaust steam is delivered through pipes 52 to the interior of the axle 22 between the heads 24. Mounted on eccentrics 60; carried on the shaft 40 are Stevenson link mechanisms 61 which are drawn in and out by means of links 62 connected to a cross head 63 which is operated by a rod 64 from a crank 65. The cranks 65 are mounted on shafts 66 which are operated by levers 67 through rods 68 from pedals 60 in the apparatus shown in Fig. 4.

Secured on each of the shafts 40 is a pinion 70 which meshes with an internal gear 71 carried in one of the wheels 72. The wheels 72 turn on roller bearings 73, mounted on the axle 22. Formed on the side of the shell 22 is a water control box 80, having a float 81 controlling a valve 82 which governs the supply of water delivered through the water supply box 83. The method of operation of my invention is as follows:

Steam being generated in the boiler 12 is delivered through the pipe 31 to the valve chests 32 of the individual engines, the admission of steam to the cylinders 34 being governed by the link mechanism 61.

In Fig. 6, the link mechanisms are shown in a neutral or cut-off position, and by turning the shaft 66, it is evident that these links can be thrown over to rotate the engine in either direction according to the standard steam engine practice.

It should be noted that there are two cylinders connected to each crank 45 and that these cylinders are set at an angle to each other so that it is impossible for the engine to stop on dead center. As these pistons 50 rotate the pinion 70, this pinion turns the wheel 72 through the internal gear 71. The exhaust steam from the engine is delivered to the pipes 52 into the center space between the heads 24 inside the axle 22. This exhaust steam is delivered by the pipe 28 to the radiator or primary condenser 13, being returned in the form of water into the axle 22 through the pipe 29.

This water is taken off through a pipe 90 by the pump 14 which is operated by a rod 93 shown in Fig. 2 from an eccentric 94 on the shaft 40. The water is delivered through a pipe 95 shown in Fig. 7 into the space between the heads 23 and 24, this water passing through the tubes 25 and 27 where it is heated by the exhaust steam which is also cooled thereby. This water is delivered through the pipe 30 to the boiler 12 having completed its cycle.

What I claim is—

In a vehicle the combination of an axle; a wheel turning in said axle; a crank shaft inside said wheel; bearings carried by said axle in which said crank shaft turns; gear means by which said crank shaft turns said wheel; two cylinders located with their axes at an angle to each other; a piston in each cylinder; means by which each piston drives said crank shaft; a reversing gear for each engine; a slide; a block moving in said slide; two links pivoted on said block, each link connecting said block with one of said reversing mechanisms; and means for moving said block in said slide.

In testimony whereof, I have hereunto set my hand at Los Angeles, California, this 28th day of January 1920.

MILON J. TRUMBLE.